(12) United States Patent
Ko (10) Patent No.: US 11,491,456 B2
(45) Date of Patent: Nov. 8, 2022

(54) HYDROGEN REFORMING SYSTEM

(71) Applicants: Hyundai Motor Company, Seoul (KR); Kia Motors Corporation, Seoul (KR)

(72) Inventor: Dong Seok Ko, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 149 days.

(21) Appl. No.: 16/996,633

(22) Filed: Aug. 18, 2020

(65) Prior Publication Data

US 2021/0283572 A1 Sep. 16, 2021

(30) Foreign Application Priority Data

Mar. 10, 2020 (KR) .................. 10-2020-0029656

(51) Int. Cl.
*B01J 19/00* (2006.01)
*B01J 19/24* (2006.01)
(Continued)

(52) U.S. Cl.
CPC ......... *B01J 19/245* (2013.01); *B01J 19/0013* (2013.01); *C01B 3/48* (2013.01);
(Continued)

(58) Field of Classification Search
CPC .... B01J 19/00; B01J 16/0006; B01J 19/0013; B01J 19/24; B01J 19/245; B01J 2219/00; B01J 2219/00002; B01J 2219/00027; B01J 2219/0004; B01J 2219/00049; B01J 2219/00051; B01J 2219/00074; B01J 2219/00117; B01J 2219/00164; B01J 2219/24; C01B 3/34; C01B 3/48; C01B 3/56; C01B 2203/0205; C01B 2203/0216; C01B 2203/0233; C01B 2203/0283; C01B 2203/042; C01B 2203/043; C01B 2203/047; C01B 2203/0475; C01B 2203/0827; C01B 2203/0833;
(Continued)

(56) References Cited

U.S. PATENT DOCUMENTS

2006/0177372 A1* 8/2006 Doshi .................... C01B 3/384
423/652

FOREIGN PATENT DOCUMENTS

KR 10-2016-0128486 A 11/2016

* cited by examiner

*Primary Examiner* — Natasha E Young
(74) *Attorney, Agent, or Firm* — Fox Rothschild LLP (57) ABSTRACT

A hydrogen reforming system includes: a reformer that generates first mixed gas through a reforming reaction between fuel gas and water; a transformer that is fed with the first mixed gas and generates second mixed gas from which carbon monoxide is removed by a water gas shift reaction; a pressure swing adsorption that purifies and separate hydrogen from the second mixed gas generated in the transformer; a heat exchanger that is provided between the reformer and the transformer and between the transformer and the PSA unit to control temperatures of the first mixed gas and the second mixed gas through heat exchange with water; a water feeder that communicates with the heat exchanger and supplies water to the heat exchanger; and a control value that is provided on a line through which water is discharged from the water feeder and adjusts a flow rate of water.

11 Claims, 4 Drawing Sheets

(51) Int. Cl.
*C01B 3/48* (2006.01)
*C01B 3/56* (2006.01)
*F28F 27/02* (2006.01)

(52) U.S. Cl.
CPC ......... *C01B 3/56* (2013.01); *B01J 2219/0004* (2013.01); *B01J 2219/00117* (2013.01); *B01J 2219/00164* (2013.01); *C01B 2203/0233* (2013.01); *C01B 2203/0283* (2013.01); *C01B 2203/042* (2013.01); *C01B 2203/0833* (2013.01)

(58) Field of Classification Search
CPC .... C01B 2203/0888; C01B 2203/1614; C01B 2203/169; F28F 27/00; F28F 27/02
See application file for complete search history.

HYDROGEN REFORMING SYSTEM

CROSS REFERENCE TO RELATED APPLICATION

The present application claims under 35 U.S.C. § 119(a) the benefit of Korean Patent Application No. 10-2020-0029656, filed Mar. 10, 2020, the entire contents of which are incorporated by reference herein.

BACKGROUND

1. Technical Field

The present disclosure relates to a hydrogen reforming system in which a water supply line is connected to a heat exchanger and provided with a control valve for controlling a flow rate of water such that mixed gas can be cooled by heat exchange with water in the heat exchanger and a temperature of the mixed gas can be stepwise controlled by the control valve.

2. Description of the Related Art

A fuel cell is a device that converts chemical energy of a fuel and an oxidizing agent into electricity and heat energy. Due to the high energy conversion rate of fuel cells compared to conventional power conversion, extensive research and development has been conducted, and fuel cells are viewed as a next-generation power generation device. When hydrogen is used as the fuel, an electrochemical reaction is very active and produces no environmentally toxic pollutants except for a trace amount of nitrogen oxide. Various techniques of utilizing hydrogen as an energy source have been developed because hydrogen is easy to store in various forms such as a high-pressure gas, liquefied gas, metal hydrides, and the like.

Steam reformation is a commercialized technology for producing hydrogen. In steam reformation, hydrogen is produced through a reformer while natural gas such as town gas is used as a fuel. For the steam reforming reaction, the reactants water and fuel gas are required. After being introduced as a liquid, the fuel gas vaporizes through heat exchange with mixed gas generated during reformation and is supplied in a gas phase. The temperature of the mixed gas is controlled by heat exchange with water.

A hydrogen reforming system allows various reactions to occur and is operated in various temperature conditions from a fuel cell feeding temperature of 80° C. to a reforming temperature of 800° C. Hence, many heat exchangers are equipped to properly control temperature conditions in a reactor where individual reactions take place. In conventional hydrogen reforming systems, heat exchangers cannot be individually controlled for temperature, which makes it impossible to control temperatures of the mixed gas in each reaction step. There is a need to solve problems of the conventional hydrogen reforming system in which the system is unstably controlled and efficiency is low as a result of the temperature and state of water in the system being influenced by the external environment.

SUMMARY

The present disclosure provides a hydrogen reforming system in which a water supply line for supplying water to the hydrogen reforming system is connected to each heat exchanger and equipped with a control vale to control a flow rate of water, such that temperatures of the mixed gas can be controlled in each reaction step.

Another aspect of the present disclosure is to provide a hydrogen reforming system, comprising: a reformer that generates first mixed gas through a reforming reaction between fuel gas and water; a transformer that is fed with the first mixed gas and generates second mixed gas from which carbon monoxide is removed by a water gas shift reaction; a pressure swing adsorption (PSA) unit that purifies and separate hydrogen from the second mixed gas generated in the transformer and discharges hydrogen-free off gas; a heat exchanger that is provided between the reformer and the transformer and between the transformer and the PSA unit to control temperatures of the first mixed gas and the second mixed gas through heat exchange with water; a water feeder that communicates with the heat exchanger and supplies water to the heat exchanger and supplies the water passing out of the heat exchanger to the reformer; and a control valve that is provided on a line through which water is discharged from the water feeder and adjusts a flow rate of water supplied to the heat exchanger to control the first mixed gas and the second mixed gas, separately.

In addition, the hydrogen reforming system may further comprise a controller controls the control valve based on feedback received on the temperatures of the first mixed gas and the second mixed gas, whereby the flow rate of water is controlled.

The controller may control the flow rate of water by adjusting the control valve depending on a load imparted to the system.

The heat exchanger may comprise a first heat exchanger that is provided between the reformer and the transformer and in which heat exchange occurs between the first mixed gas and water; and a second heat exchanger and a third heat exchanger that are provided between the transformer and the PSA unit and in which heat exchange occurs between the second mixed gas and water, and wherein the water feeder comprises a first supply line connected to the first heat exchanger and supplying water thereto, a second supply line connected to the second heat exchanger and supplying water thereto, and a third supply line connected to the third heat exchanger and supplying water thereto, whereby temperatures of the first mixed gas and the second mixed gas are separately controlled.

The heat exchanger may comprise a fourth heat exchanger that is provided at an entrance of the PSA unit to which the second mixed gas is introduced, wherein the fourth exchanger is selectively operated depending on temperatures of the second mixed gas The control valve may comprise a first control valve provided on the first supply line to control a flow rate of water running through the first supply line, and a second control valve provided on the third supply line to control a flow rate of water running through the third supply line, whereby the flow rates of water running through the first supply line and the third supply line are controlled separately.

The hydrogen reforming system may further comprise: a first temperature sensor that measures a temperature of the first mixed gas; and a second temperature sensor that measures a temperature of the second mixed gas, wherein the first control valve is given feedback on a measurement of the first temperature sensor to control a flow rate of the first supply line, and the second control valve is given feedback on a measurement of the second temperature sensor to control a flow rate of the second supply line.

The heat exchanger may further comprise a fifth heat exchanger provided at an entrance of the reformer; and the water supply line may comprises a fourth supply line formed downstream of the heat exchanger after the first supply line to the third supply line to supply heated water to the fifth heat exchanger therethrough.

The hydrogen reforming system may further comprise a fuel gas supply line through which fuel gas is supplied to the second supply line so that the second mixed gas undergoes heat exchange with water and the fuel gas and water.

The water feeder may comprise a fourth supply line formed downstream of the heat exchanger after the first supply line to the third supply line wherein the heated water is fed through the fourth supply line to the fifth heat exchanger and the fuel gas passing out of the second heat exchanger is recovered, together with water, through the fourth supply line.

The fuel gas supply line may be provided with a gas control valve to control a flow rate of fuel gas and with a third temperature sensor that measures a temperature of the second mixed gas flowing out of the second heat exchanger wherein the gas control valve is given feedback on a measurements of the third temperature sensor to control a flow rate in the fuel gas supply line.

The heat exchanger may further comprise: between the second heat exchanger and the third heat exchanger a sixth heat exchanger in which the second mixed gas undergoes heat exchange with the fuel gas; and a fuel gas supply line through which fuel gas is supplied to the sixth heat exchanger to allow the second mixed gas to undergo heat exchange with the fuel gas.

The fuel gas supply line may be provided with a gas control valve to control a flow rate of fuel gas and with a third temperature sensor for measuring a temperature of the second mixed gas passing through the sixth heat exchanger wherein the gas control valve is given feedback on a measurement of the third temperature sensor to control a flow rate in the fuel gas supply line.

As described hitherto, the hydrogen reforming system of the present disclosure is designed to control temperatures of mixed gas in each reaction step by adjusting flow rates of water. Hence, even when external environments are changed, the system can consistently control temperatures of the mixed gas and exhibit improved stability and efficiency.

In an embodiment where fuel gas is used as a refrigerant, the fuel gas is heated before being introduced into the reformer, whereby the efficiency of the system can be improved.

Furthermore, after the temperature of the mixed gas is decreased below a predetermined point by using water as a refrigerant, the operation of the heat exchanger employing cooling water as a refrigerant is stopped, thereby increasing the production efficiency.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions related to embodiments according to the present disclosure and disclosed in the present specification or application are merely illustrated to describe embodiments of the present disclosure. The embodiments of the present disclosure may be implemented in various forms and should not be interpreted as being limited to the embodiments described in the present specification or application.

The embodiments according to the present disclosure may be modified in various manners and may have various forms, so that specific embodiments are intended to be illustrated in the drawings and described in detail in the present specification or application However, it should be understood that those embodiments are not intended to limit the embodiments based on the concept of the present disclosure to specific disclosure forms and they include all changes, equivalents or modifications included in the spirit and scope of the present disclosure.

The terms such as "first" and "second" may be used to describe various components, but those components should not be limited by the terms. The terms are merely used to distinguish one component from other components, and a first component may be designated as a second component and a second component may be designated as a first component in the similar manner, without departing from the scope based on the concept of the present disclosure.

Hereinafter, embodiments of the present disclosure will be described in detail with reference to the attached drawings. The same reference numerals are used throughout the different drawings to designate the same or similar components.

Figure 1:
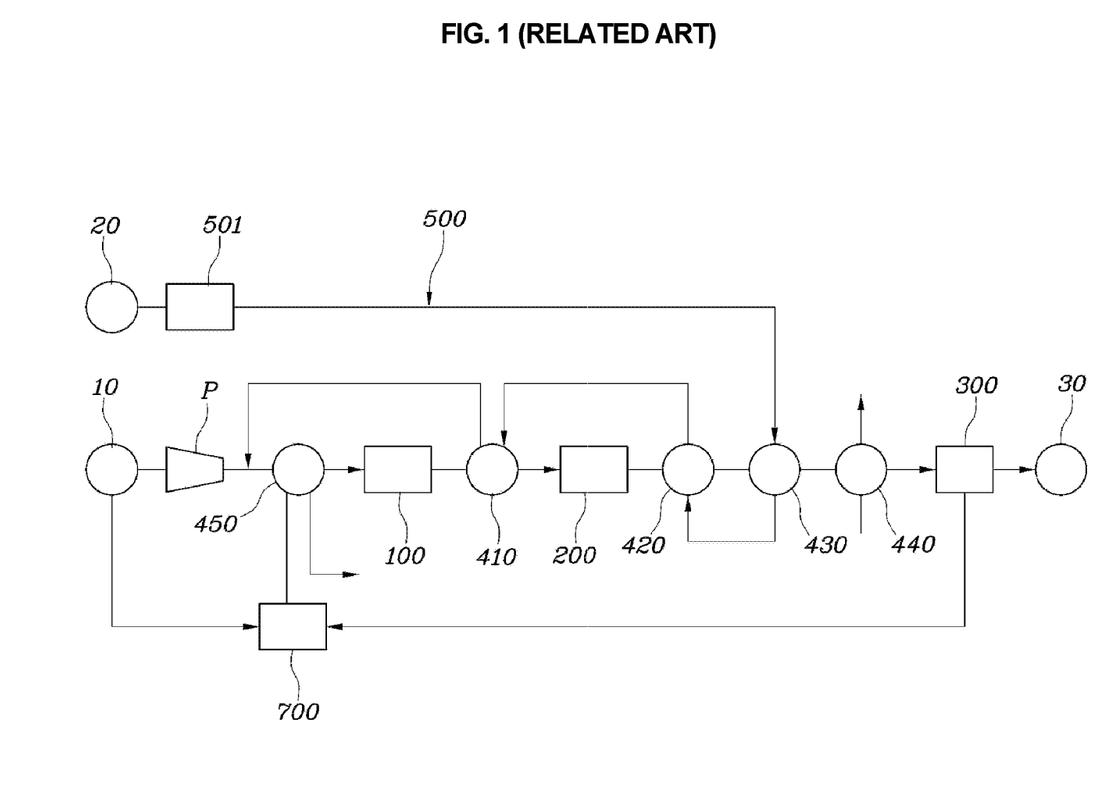
FIG. 1 (RELATED ART) is a schematic view of a conventional hydrogen reforming system.

FIG. 1 (RELATED ART) is a schematic configurational view of a conventional hydrogen reforming system.

With reference to FIG. 1, the conventional hydrogen reforming system is configured such that after being supplied from a water feeder 20, water is heated to become vapor while passing through a third heat exchanger 430, a second heat exchanger 420, and a first heat exchanger 410 in sequence. In a reformer 100, steam and fuel gas are subjected to a reformation reaction to produce mixed gas including hydrogen. The mixed gas undergoes a purification process and then proceeds to a fourth heat exchanger 440 where the purified gas is quenched by heat exchange with cooling water before supply to a pressure swing adsorption (PSA) unit 300.

A refrigerant used in the first heat exchanger 410, the second heat exchanger 420, and the third heat exchanger 430 is the water fed from the water feeder 20 while a refrigerant in the fourth heat exchanger 440 is cooling water supplied separately. In the conventional hydrogen reforming system, temperatures and states of the water are influenced by the external environment, which makes it unstable to control the temperature of the mixed gas. Thus, the difficulty in stable temperature control leads to unstable control of the overall system and lowers the efficiency of the system.

The present disclosure pertains to a hydrogen reforming system which can precisely control the temperature of the mixed gas by controlling the flow rates of water supplied to a plurality of heat exchangers. Even if the external environment changes, the hydrogen reforming system of the present disclosure can control the temperature of mixed gas in each step, and as such, exhibits the technical effect of being able to produce hydrogen effectively and stably.

Figure 2:
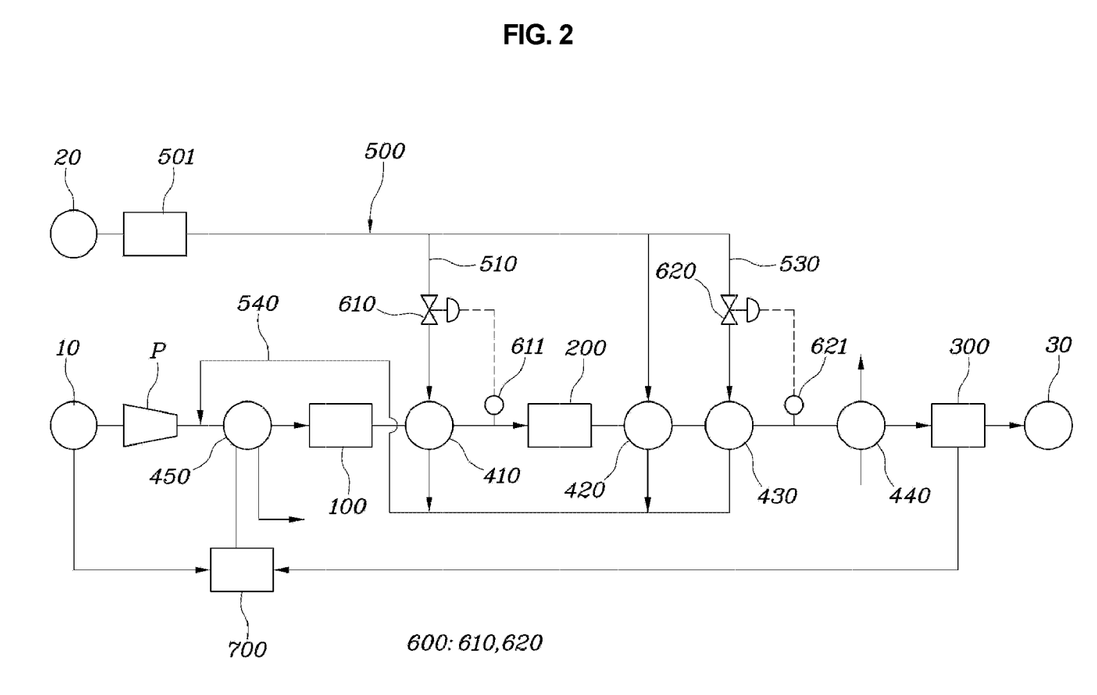
FIG. 2 is a schematic view of a hydrogen reforming system according to a first embodiment of the present disclosure.

FIG. 2 is a schematic view of a hydrogen reforming system according to a first embodiment of the present disclosure.

With reference to FIG. 2, the hydrogen reforming system according to a first embodiment of the present disclosure may comprise a reformer 100, a transformer 200, a pressure swing adsorption (PSA) unit 300, a heat exchanger 400, a water supply line 500, and a control valve 600.

Fuel gas, which utilizes natural gas as a hydrogen source, may be town gas dispensed to each home. The fuel gas supplied by a fuel gas feeder 10 may be pressurized to up to about 8 bar by a gas compressor (P).

The reformer 100 may form a first mixed gas containing hydrogen through a reforming reaction. The reforming reaction between fuel gas and water to form first mixed gas in the reformer 100 is as conducted in the following reaction formula 1:

[Reaction Formula 1]

$$CH_4 + H_2O \longrightarrow CO + 3H_2$$

The methane-steam reforming reaction of reaction formula 1 is a strong endodermic reaction. Therefore, a burner 700 for supplying reaction heat to the reformer 100 is needed because the reaction actively takes place in a high-temperature condition. The burner 700 can supply heat necessary for the reaction by burning the off gas discharged from PSA unit 300 and the fuel gas.

With reference to reaction formula 1, the reforming reaction between hydrocarbon and steam produces a first mixed gas containing hydrogen and carbon monoxide. The first mixed gas is cooled through heat exchange with water in a first heat exchanger 410 and then introduced into a transformer 200.

The transformer 200 receives the first mixed gas and removes carbon monoxide from the first mixed gas to produce a second mixed gas. A process of removing carbon monoxide may be needed because carbon monoxide acts as a poison to a catalyst used in an electrode of a fuel cell stack. Generally, carbon monoxide is removed through the water gas shift reaction as in the following reaction formula 2:

[Reaction Formula 2]

$$CO + H_2O \longrightarrow CO_2 + H_2$$

Referring to reaction formula 2, the second mixed gas may contain carbon dioxide and hydrogen. The second mixed gas is cooled before introduction into PSA unit 300.

PSA unit 300 purifies and separates hydrogen from the second mixed gas and discharges off gas containing carbon dioxide. The off gas is introduced into the bunter 700 and combusted therein. The hydrogen purified in PSA unit 300 is supplied to a customer 30.

A water supply line 500 can function to supply the water of a water feeder 20 to the system. Water may be pure water or ultrapure water for use in reforming reaction. The water supply line 500 may be provided with a water supply pump 501 which determines the overall flow rate of water discharged.

A heat exchanger 400 may be provided between the reformer 100 and the transformer PSA unit 300 and between the transformer 200 and the PSA unit 300. The first mixed gas and the second fixed gas can be cooled by heat exchange with water in the heat exchanger. The heat exchanger 400 is connected to the water supply line 500 and receives water. The water passes through the heat changer and proceeds to the reformer 100 where the water is used for the reformation.

A control valve 600 is arranged in the water supply line 500 and adjusts the flow rate of water supplied to the heat exchanger 400. As the control valve 600 adjusts a flow rate of water, temperatures of the first mixed gas and the second mixed gas can be individually controlled. When there is a need to further cool the first mixed gas and the second mixed gas, the control valve 600 is opened to increase the flow rate of water.

In addition, the hydrogen reforming system according to the first embodiment may further include a controller. The controller receives feedback on temperatures of the first mixed gas and the second mixed gas to control the control valve 600 and thus the temperatures. Given proper temperature ranges set for the first mixed gas and the second mixed gas, the controller controls the control valve 600 with reference to the set values. The system comprises a temperature sensor to measure temperatures of the first mixed gas and the second mixed gas.

When the temperatures of the first mixed gas and the second mixed gas exceed the set values, the controller opens the control valve 600 to increase the flow rate of water, thereby lowering the temperatures of the mixed gas. In contrast, when temperatures of the first mixed gas and the second mixed gas are lower than the set values, the controller closes the control valve 600 to decrease the flow rate of water, thereby elevating the temperatures of the mixed gas.

Depending on the load of the system, the controller can control the control valve 600 to adjust the flow rate of water. For example, when the system is operated at a load of 100%, the control valve 600 is fully open. For system operation at a load of 50%, the control valve 600 partially closes to reduce the flow rate of water.

Referring to FIG. 2, the heat exchanger 400 may comprise a first heat exchanger 410, a second heat exchanger 420, and a third heat exchanger 430. The first heat exchanger to 410 is provided between the reformer 100 and the transformer 200 to cool the first mixed gas by heat exchange with water therein. The second heat exchanger 420 and the third heat exchanger 430 are arranged between the transformer 200 and the PSA unit 300 to cool the second mixed gas by heat exchange with water therein. The fourth heat exchanger 440 is provided at the entrance of the PSA unit 300. After passing through the third heat exchanger 430, water is introduced into the fourth heat exchanger 440 and cooled through heat exchange with cooling water therein.

Each of the first heat exchanger 410, the second heat exchanger 420, and the third heat exchanger 430 may be configured to communicate with the water supply line 500 and receive water directly. As can be seen in FIG. 2, the water supply line 500 may comprise a first supply line 510, a second supply line 520, and third supply line 530 which are connected to and supply water to the first heat exchanger 410, the second heat exchanger 420, and the third heat exchanger 430, respectively.

When pumped by a water pump 501, water travels through the water supply line 500 and then through the first supply line 510, the second supply line 520, and the third supply line 530. The first supply line 510 may be provided with a first control valve 610 for controlling the flow rate of water flowing into the first heat exchanger 410. On the third supply line 530, a second control valve 620 may be installed to control the flow rate of water flowing into the third heat exchanger 430. By first control valve 610 and the second control valve 620, the flow rates of water flowing into the first heat exchanger 410 and the third heat exchanger 430 are controlled, respectively. The remainder water runs through the second supply line 520 into the second heat exchanger 420. Therefore, the flow rate of water in the second supply line 520 is controlled by the first control valve 610 and the second control valve 620.

Referring to FIG. 2, the heat exchanger may comprise a fourth heat exchanger 440 which is provided at the entrance of the PSA unit 300 to which the second mixed gas is introduced, to cool the second mixed gas through heat exchange with cooling water therein. The fourth heat exchanger 440 does not communicate with the water supply line 500, but is supplied with cooling water from a separate cooling water feeder connected thereto. The fourth heat exchanger 440 may be selectively operated, depending on the temperature of the second mixed gas. When the temperature of the second mixed gas is sufficiently reduced by the heat exchanger connected to the water supply line 500, the fourth heat exchanger 440 does not run, with the resultant improvement of efficiency in the system.

In addition, the hydrogen reforming system according to the first embodiment of the present disclosure may further comprise a first temperature sensor 611 and a second temperature sensor 621 that measures temperatures of the first and the second mixed gas, respectively.

Referring to FIG. 2, the first temperature sensor 611 may be provided between the first heat exchanger 410 and the transformer 200 to measure the temperature of the first mixed gas coming from the first heat exchanger 410. Thus, the first temperature sensor 611 can measure the temperature of the first mixed gas from transformer 200.

The second temperature sensor 621 may be positioned between the third heat exchanger 430 and the PSA unit 300 to measure the temperature of the second mixed gas from the third heat exchanger 430. When the fourth heat exchanger 440 is given, the second temperature sensor 621 may be provided between the third heat exchanger 430 and the fourth heat exchanger 440.

The first control valve 610 can be given feedback on the temperature information of the first mixed gas, measured by the first temperature sensor 611, to control the flow rate of water in the first supply line 510. That is, when the temperature information measured by the first temperature sensor 611 is higher than the set value for maintenance of a proper temperature range of the first mixed gas, the first control valve 610 is opened to increase the flow rate of water running through the first supply line 510. When the flow rate of water is increased, the first mixed gas is cooled to the set value for maintenance of the proper temperature range. In this condition, the first control valve 610 can operate to reduce the flow rate of water.

The second control valve 620 can be given feedback on the temperature information of the second mixed gas, measured by the second temperature sensor 621, to control the flow rate of water in the second supply line 520. That is, when the temperature information measured by the second temperature sensor 621 is higher than the set value for maintenance of a proper temperature range of the second mixed gas, the second control valve 620 is opened to increase the flow rate of water running through the second supply line 520. When the flow rate of water is increased, the second mixed gas is cooled to the set value for maintenance of the proper temperature range. In this condition, the second control valve 620 can operate to reduce the flow rate of water.

As such, the hydrogen reforming system of the present disclosure can perform more stable temperature control than conventional systems because the first control valve 610 and the second control valve 620 control flow rates of water depending on temperatures of the first mixed gas and the second mixed gas, respectively. In order to control flow rates of water on the basis of temperatures of the mixed gas, electrical connection may be made between the first temperature sensor 611 and the first control valve 610 and also between the second temperature sensor 621 and the second control valve 620.

In addition, the water supply line 500 may comprise a fourth supply line 540 formed downstream of the heat exchanger after the first supply line 510, the second supply line 520, and the third supply line 530. The water heated by heat exchange during passage through the first heat exchanger 410, the second heat exchanger 420, and the third heat exchanger 430 is fed through the fourth supply line 540 to a fifth heat exchanger 450 provided at the inlet of the reformer 100. The water running through the water supply line 500 is heated and vaporized by heat exchange with the first mixed gas and the second mixed gas, and the steam thus formed is supplied through the fourth supply line 540 to the reformer 100 where reformation takes place.

The fifth heat exchanger 450 may be provided at the inlet of the reformer 100. Fuel gas and steam are supplied to the fifth heat exchanger 450. The burner 700 combusts the fuel gas and off gas to generate heat energy which is then fed to the fifth heat exchanger 450 so as to achieve an elevated temperature necessary for reformation. Through the fourth supply line 540, a mixture of water and steam is directed to the fifth heat exchanger 450.

The fourth heat exchanger 440 may be positioned between the third heat exchanger 430 and the PSA unit 300. The fourth heat exchanger 440 cools the second mixed gas flowing out of the third heat exchanger 430 by heat exchange with cooling water and may selectively operate depending on temperatures of the second mixed gas. After being discharged from the transformer 200, the second mixed gas is cooled by heat exchange with water upon passing through the second heat exchanger 420 and the third heat exchanger 430. When the temperature of the second mixed gas is sufficiently low, the fourth heat exchanger 440 does not need to be operated. In this context, the second mixed gas is directly introduced into the PSA unit 300.

The temperature of the second mixed gas flowing into the PSA unit 300 can be controlled by operating the fourth heat exchanger 440 which employs cooling water as a refrigerant. Hence, the operation of the fourth heat exchanger 440 is included in the basic operation mode of the hydrogen reforming system. However, the hydrogen reforming system of the present disclosure can control temperatures of the first mixed gas and the second mixed gas through the first control valve 610 and the second control valve 620. In the case where the second mixed gas flowing out of the third heat exchanger 430 is cooled to a temperature at which the second mixed gas can directly flow into the PSA unit 300, the hydrogen reforming system turns to an optimum efficiency mode in which the fourth heat exchanger 440 does not operate. As such, the hydrogen reforming system takes maximal advantage of internal heat to increase the overall efficiency.

Figure 3:
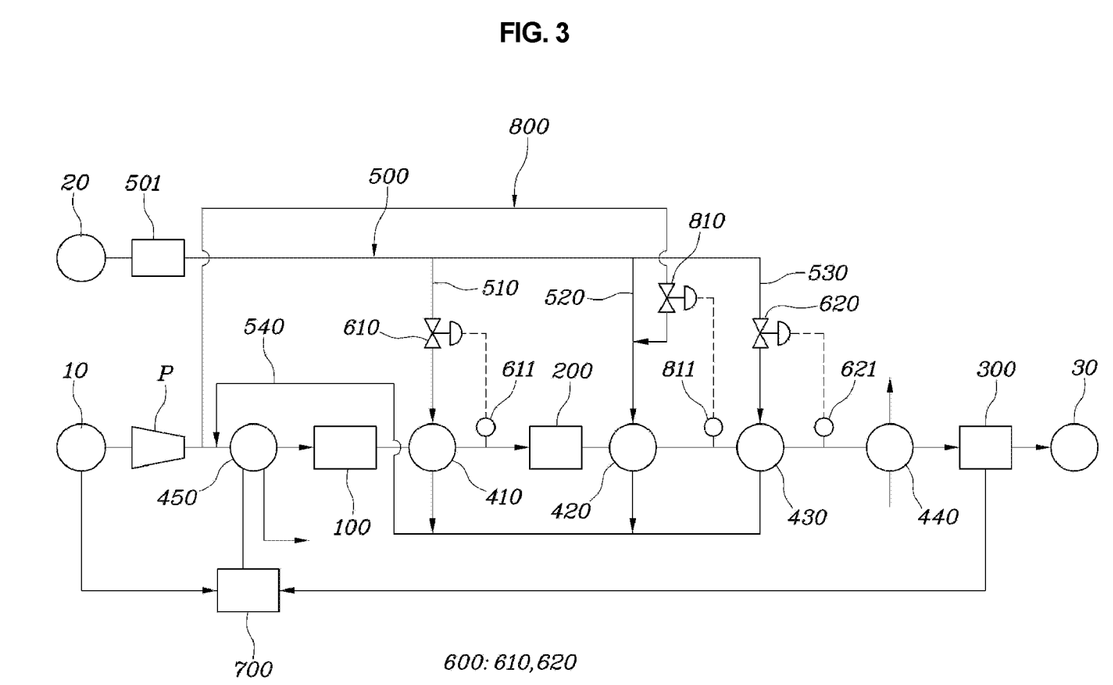
FIG. 3 is a schematic view of a hydrogen reforming system according to a second embodiment of the present disclosure.

FIG. 3 is a schematic view of a hydrogen reforming system according to a second embodiment of the present disclosure. With reference to FIG. 3, the hydrogen reforming system according to a second embodiment of the present disclosure may be configured to employ fuel gas as a refrigerant. The system may further comprise a fuel gas supply line 800 through which fuel gas is supplied to the second supply line 520 so that the fuel gas undergoes heat exchange with the second mixed gas.

After being supplied to the second supply line 520 through the supply line 800, fuel gas can flow, together with water, into the second heat exchanger 420. In the second heat exchanger 420, the water and the fuel gas are used as a refrigerant to cool the second mixed gas. After traveling through the fuel gas supply line 800, the fuel gas is mixed with water in the second supply line 520 and the mixture is introduced into the second heat exchanger 420 where the second mixed gas can be thermally exchanged, with water and fuel gas serving as a refrigerant.

The fuel gas thermally exchanged in the second heat exchanger 420 is heated by heat exchange with the second mixed gas and can be recovered, together with water, through the fourth supply line 540. The fourth supply line 540 is connected to the entrance of the reformer 100 so that the heated water and fuel gas can be used in the reforming reaction. The water and fuel gas recovered through the fourth supply line 540 are further heated by the burner 700 and then introduced into the reformer 100 where the reforming reaction takes place. The use of fuel gas as a refrigerant makes it possible to increase the temperature of the fuel gas with the heat of the mixed gas, thus improving the overall heat efficiency of the entire system.

Furthermore, the fuel gas supply line 800 may be provided with a gas control valve 810 to control the flow rate of fuel gas. The gas control valve 810 can control the temperature of the second mixed gas by adjusting the flow rate of fuel gas supplied to the second supply line 520.

At the rear end of the second heat exchanger 420, a third temperature sensor 811 may be installed for measuring the temperature of the second mixed gas flowing out of the second heat exchanger 420. Given feedback on the measurements of the third temperature sensor 811, the gas control valve 810 can control the flow rate in the fuel gas supply line 800. For example, when the temperature of the second mixed gas is higher than a set value as measured by the third temperature sensor 811, cooling is needed. In this regard, the control valve 810 operates to increase the flow rate of the fuel gas. In contrast, when the temperature of the second mixed gas is lower than a set value as measured by the third temperature sensor 811, the gas control valve 810 operates to decrease the flow rate of fuel gas.

For a better understanding of the present disclosure, a description will be provided with numerical examples. However, it should be understood that the temperature values are set forth for purposes of illustration, but not to limit the present disclosure.

Proper temperatures are set to be 300° C. for the first mixed gas passing out of the first heat exchanger 410, 180° C. for the second mixed gas passing out of the second heat exchanger 420, and 120° C. for the second mixed gas passing out of the third heat exchanger 430. The temperatures within allowable errors to the proper temperatures are established as set values.

The first mixed gas flowing out of the reformer 100 is cooled by heat exchange with water in the first heat exchanger 410. Because the first mixed gas to be introduced into the transformer 200 should have the proper temperature of 300° C., the first control valve 610 may operate depending on comparison between the measurement of the first temperature sensor 611 and the set value. The first control valve 610 can control the temperature of the first mixed gas by adjusting the flow rate of water running through the first supply line 510. After being discharged from the transformer 200, the second mixed gas may be cooled in the second heat exchanger 420 and the third heat exchanger 430. When a measurement in the third temperature sensor 811 departs from the set value established around the reference of 180° C., the second control valve 620 controls the flow rate of water in the second supply line 520. Likewise, when a measurement in the second temperature sensor 621 departs from the set value established around the reference of 120° C., the third control valve controls the flow rate of water in the third supply line 530.

In the case where the system operates in an optimal efficiency mode, even when a measurement in the third temperature sensor 811 is below 120° C., the third control valve operates such that the flow rate of water running through the third supply line 530 remains unchanged. When a measurement in the third temperature sensor 811 decreases to 40° C. or lower, the influx of cooling water is stopped to terminate the operation of the fourth heat exchanger 440. In this case, the system operates in an optimal efficiency mode, thereby taking advantage of the internal heat to increase the efficiency.

As described herein, the controller may operate the control valve.

Figure 4:
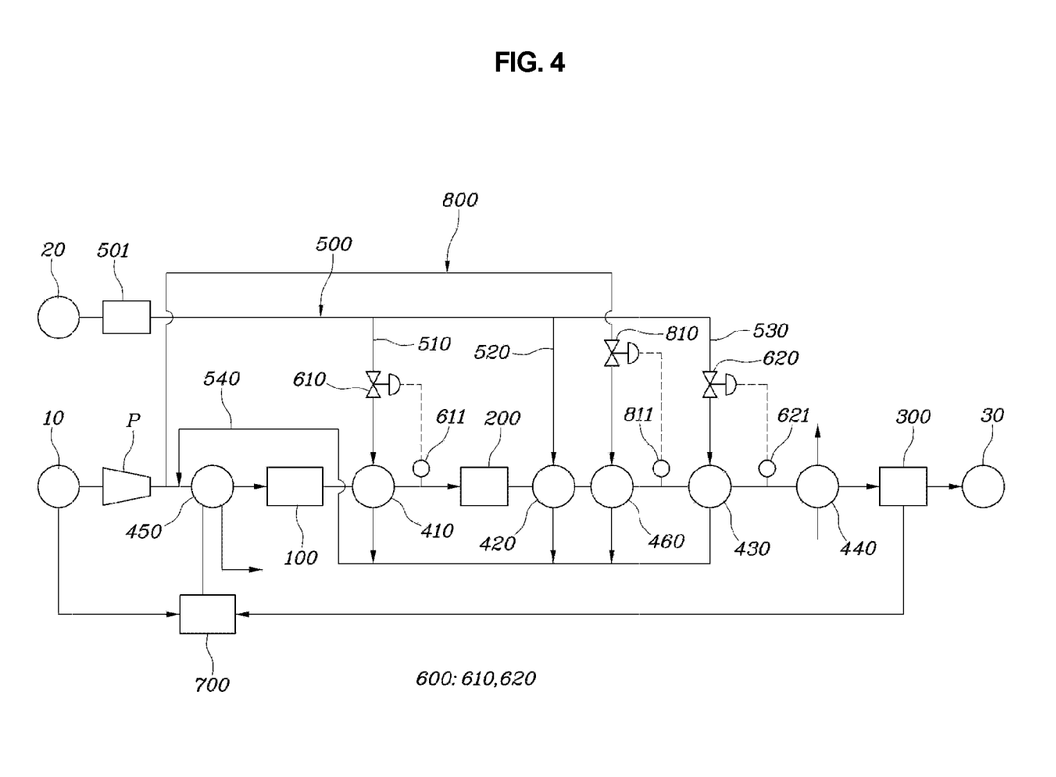
FIG. 4 is a schematic view of a hydrogen reforming system according to a third embodiment of the present disclosure.

FIG. 4 is a schematic view of a hydrogen reforming system according to a third embodiment of the present disclosure. With reference to FIG. 4, the hydrogen reforming system according to a third embodiment of the present disclosure may further include a sixth heat exchanger 460.

The sixth heat exchanger 460 may be provided between the second heat exchanger 420 and the third heat exchanger 430. The sixth heat exchanger 460 communicates with the fuel gas supply line 800. In the sixth heat exchanger 460 to which fuel gas is supplied, the second mixed gas passing out of the second heat exchanger 420 can be cooled by heat exchange with the fuel gas. Unlike the second embodiment, the third embodiment further comprises the sixth heat exchanger 460 which employs only fuel gas as a refrigerant, and as such, can provide more precise temperature control.

In the third embodiment, the fuel gas supply line 800 may also be provided with a gas control valve 810 for controlling a flow rate of fuel gas and a third temperature sensor 811 may be installed at the rear end of the sixth heat exchanger 460. Given feedback on measurements of third temperature sensor 811 for the temperatures of the second mixed gas, the control valve 810 can control flow rates of fuel gas.

A detailed description is omitted of configurations and technical advantages other than those separately described in the second and the third embodiment of the present disclosure because they are the same as in the first embodiment.

Although embodiments of the present disclosure have been disclosed for illustrative purposes, those skilled in the art will appreciate that various modifications, additions and substitutions are possible, without departing from the scope and spirit of the disclosure as disclosed in the accompanying claims. Therefore, the technical scope of the present disclosure should be defined by the technical spirit and scope of the accompanying claims.

What is claimed is:

1. A hydrogen reforming system, comprising:
a reformer that generates a first mixed gas through a reforming reaction between fuel, gas, and water;
a transformer that is fed with the first mixed gas and generates a second mixed gas from which carbon monoxide is removed by a water gas shift reaction;
a pressure swing adsorption (PSA) unit that purifies and separate hydrogen from the second mixed gas generated in the transformer and discharges hydrogen-free off gas;
a heat exchanger that is provided between the reformer and the transformer and between the transformer and the pressure swing adsorption (PSA) unit to control temperatures of the first mixed gas and the second mixed gas through heat exchange with water;
a water feeder that communicates with the heat exchanger and supplies water to the heat exchanger and supplies the water passing out of the heat exchanger to the reformer; and
a plurality of of control valves, wherein respective ones of the plurality of controls valves are provided on respective lines through which water is discharged from the water feeder and configured to adjust a flow rate of water supplied to the heat exchanger to control the first mixed gas and the second mixed gas, separately;
wherein the heat exchanger comprises:
a first heat exchanger that is provided between the reformer and the transformer and in which heat exchange occurs between the first mixed gas and water, and
a second heat exchanger and a third heat exchanger that are provided between the transformer and the PSA unit and in which heat exchange occurs between and the second mixed gas and water,
a first supply line connected to the first heat exchanger and supplying water thereto,
a second supply line connected to the second heat exchanger and supplying water thereto, and
a third supply line connected to the third heat exchanger and supplying water thereto,
whereby temperatures of the first mixed gas and the second mixed gas are separately controlled; and
a fuel gas supply line through which fuel gas is supplied to the second supply line so that the second mixed gas undergoes heat exchange with water and the fuel gas and water.

2. The hydrogen reforming system of claim 1, further comprising a controller that controls the plurality of control valves based on feedback received on the temperatures of the first mixed gas and the second mixed gas, whereby the flow rate of water is controlled.

3. The hydrogen reforming system of claim 1, wherein the controller controls the flow rate of water by adjusting the control depending on a load imparted to the hydrogen reforming system.

4. The hydrogen reforming system of claim 1, wherein the heat exchanger comprises a fourth heat exchanger that is provided at an entrance of the PSA unit to which the second mixed gas is introduced, wherein the fourth exchanger is selectively operated depending on temperatures of the second mixed gas.

5. The hydrogen reforming system of claim 1, wherein the piurality of control valve comprise a first control valve provided on the first supply line to control a flow rate of water running through the first supply line, and a second control valve provided on the third supply line to control a flow rate of water running through the third supply line, whereby the flow rates of water running through the first supply line and the third supply line are controlled separately.

6. The hydrogen reforming system of claim 5, further comprising:
a first temperature sensor that measures a temperature of the first mixed gas; and
a second temperature sensor that measures a temperature of the second mixed gas,
wherein the first control valve is given feedback on a measurement of the first temperature sensor to control a flow rate of the first supply line, and the second control valve is given feedback on a measurement of the second temperature sensor to control a flow rate of the second supply line.

7. The hydrogen reforming system of claim 4, wherein:
the heat exchanger further comprises a fifth heat exchanger provided at an entrance of the reformer; and the water feeder comprises a fourth supply line formed downstream of the heat exchanger after the first supply line to the third supply line to supply heated water to the fifth heat exchanger therethrough.

8. The hydrogen reforming system of claim 1, wherein the water feeder comprises a fourth supply line formed downstream of the heat exchanger after the first supply line to the third supply line, and wherein the heated water is fed through the fourth supply line to the fifth heat exchanger and the fuel gas passing out of the second heat exchanger is recovered, together with water, through the fourth supply line.

9. The hydrogen reforming system of claim 1, wherein the fuel gas supply line is provided with a gas control valve to control a flow rate of fuel gas and with a third temperature sensor that measures a temperature of the second mixed gas flowing out of the second heat exchanger wherein the gas control valve is given feedback on a measurements of the third temperature sensor to control a flow rate in the fuel gas supply line.

10. The hydrogen reforming system of claim 7, wherein the heat exchanger further comprises:

between the second heat exchanger and the third heat exchanger, a sixth heat exchanger in which the second mixed gas undergoes heat exchange with the fuel gas; and a fuel gas supply line through which fuel gas is supplied to the sixth heat exchanger to allow the second mixed gas to undergo heat exchange with the fuel gas.

11. The hydrogen reforming system of claim 10, wherein the fuel gas supply line is provided with a gas control valve to control a flow rate of fuel gas and with a third temperature sensor for measuring a temperature of the second mixed gas passing through the sixth heat exchanger wherein the gas control valve is given feedback on a measurement of the third temperature sensor to control a flow rate in the fuel gas supply line.

* * * * *